Sept. 25, 1923.

E. M. TOTZKE 1,469,057

VEHICLE SPRING CONSTRUCTION

Filed June 24, 1921

Inventor
E. M. Totzke
By Arthur F. Durand
Atty.

Patented Sept. 25, 1923.

1,469,057

UNITED STATES PATENT OFFICE.

EMIL M. TOTZKE, OF ST. JOSEPH, MICHIGAN.

VEHICLE SPRING CONSTRUCTION.

Application filed June 24, 1921. Serial No. 480,002.

*To all whom it may concern:*

Be it known that I, EMIL M. TOTZKE, a citizen of the United States, and a resident of St. Joseph, Berrien County, State of Michigan, have invented a certain new and useful Improvement in Vehicle Spring Constructions, of which the following is a specification.

This invention relates to vehicle springs in general, but more particularly to those employed on motor vehicles, and especially those which have longitudinally extending leaf springs by which the load weight is imposed on the axle of the vehicle.

Generally stated, the object of the invention is to provide a novel and effective spring device which can be applied to the leaf springs of the vehicle, as a sort of supplemental shock absorber, thereby to reduce vibration and minimize the shocks ordinarily produced when a motor vehicle travels over a rough road or strikes an obstruction.

It is also an object to provide certain details and features of construction and combinations tending to increase the general efficiency and the desirability of an auxiliary spring device or shock absorber of this particular character.

To these and other useful ends, the invention consists in matters hereinafter set forth and claimed and shown in the accompanying drawings, in which:

Figure 1:
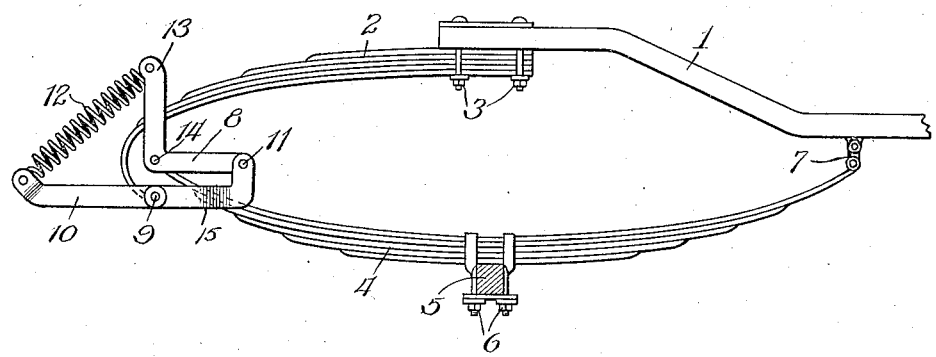
Figure 1 is a side elevation of a vehicle spring having a shock absorber embodying the principles of the invention.

As thus illustrated, the automobile or other vehicle may have a body frame or chassis 1 of any suitable or desired character. As shown, the leaf springs of the vehicle are of the kind in which each complete spring comprises an upper half section 2 secured to the frame by bolts or clips 3, and a lower full length section 4, secured to the axle 5 by clips or bolts 6 of any suitable or desired character. One end of the lower section 4 is secured or pivotally connected at 7 to the under side of the body frame, but the other end thereof has a bell crank 8 pivoted thereto in the manner shown in the drawings. The section 2 of the leaf spring has its free end bent downward and provided with a pivot 9 which supports the lever 10, it being understood that both the bell crank 8 and the lever 10 are preferably made double to embrace the leaf spring sections to which they are attached. The width of the leaf springs 2 and 4, of course, is immaterial, and may be just what is ordinary or usual in motor vehicles of this kind, and in any event the double levers 8 and 10 will be wide enough to embrace the leaf springs 2 and 4, so that one-half of the lever 8 is at one side of these leaf springs while the other half is at the other side, with the two halves disposed close enough together to allow the arrangement to operate without undue friction against the leaf springs; and the two halves of the lever 10 are correspondingly arranged at opposite sides of the leaf springs; but the coil spring 12 with this arrangement is disposed in the vertical plane of the two leaf springs 2 and 4, and the leaf spring 2 is embraced by both of the levers 8 and 10, and this is also true of the leaf spring 4, and the latter is also embraced by the two halves of each lever. The bell crank 8 and the lever 10 are pivotally connected together at 11, and their other ends are connected by a coil spring 12, which is a tension spring, of course, as it sustains a tensile strain instead of a compression strain when the load weight is communicated thereto. The toggle joint 11 is, of course, above the lower member 4, so that the latter is held between the sides of the lever 10, as shown. In other words, the load weight is communicated to the section 2 of the leaf spring, then to the pivot 9, then to the lever 10, then to the spring 12, then to the upper end portion 13 (the portion 13 forms a guide for spring 2) of the bell crank, then to the pivot 14 of said bell crank, and then from the later to the pivot 11 which connects the two levers together, whereby a load weight tends to exert a pull on the spring 12, and the latter thus serves as a shock absorber to minimize the vibration. The sides of the portion 13 form a guide in which the rear end portion of the upper member 2 is free to move up and down and is held against lurching sidewise out of line with the lower member 4, as the upper member engages the sides of the portion 13 close to the pivot 14, so that the connection is not flimsy, but will hold the two leaf springs in alinement vertically against side lurch, even should the spring 12 break. In addition, of course, the load weight is communicated from the section 2 of the leaf spring to the pivot 9, and from the latter to the pivot 11 and finally to the pivot 14, so that the load weight is communicated to the lower section 4 of the leaf spring, whereby the two sections of the leaf spring and the coil spring 12 of the shock absorber or auxiliary spring device are in the same vertical plane and co-operate and conjointly sustain the load weight and reduce or minimize the vibration and shock resulting from the passage of the vehicle over a rough road or over an obstruction. The guide 13 for the upper member 2 forms no part of the connection from 14 to 11 and from 11 to 9, as this guide could be omitted or broken off without breaking the continuity of the link connection thus formed between the two leaf springs. The lever 10 forms a guide (the portion 15 forms the guide) for the lower member 4, as shown.

Figure 2:
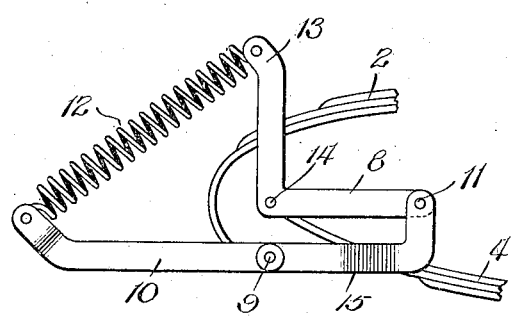
Figure 2 is an enlarged side elevation of said shock absorber or auxiliary spring device.
Figure 3:
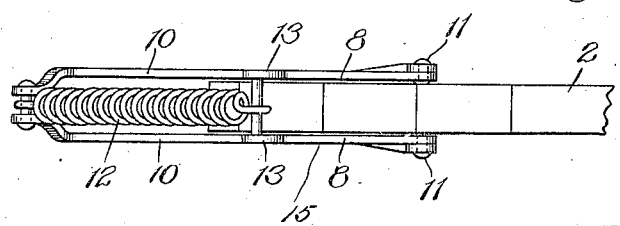
Figure 3 is a plan of the construction shown in Figure 2.

Of course, as shown the members 2 and 4 are, as stated, the upper and lower sections of the ordinary leaf spring construction by which it will be understood that for the broader purposes of the invention, in so far as the capacity of the spring 12 to sustain the load weight is concerned, the said members 2 and 4 may be of any suitable or desired character. The pivotal or toggle joint 11, as shown very clearly in Figures 1 and 2, is not only above the leaf spring 4, but is below the leaf spring 2, which latter shows extending above in Figure 3 of the drawing. The pivotal connections for the levers may be of any suitable character, of course, and may be formed by hinging or pivotal means of any suitable character, but it is important that the different pivotal points be located substantially as shown and described, and it is especially important that the joint 11 be disposed between the upper and lower leaf springs, and this is the reason that the toggle end of the lever 10 is turned up at its front end, or at its end nearest the axle, so that the guide 15 will be formed for the lower leaf spring 4, and so that the joint 11 will be normally at the point indicated, thereby to ensure the desired result.

It will be seen that the pivotal connection between the upper and lower springs 2 and 4, forms a knuckle joint 11 which projects or extends toward the axle upon which the lower spring 4 rests when the vehicle is in use. The other ends of the pivotal connection extend in the opposite direction, or away from the axle, to a point where they are connected by the spring 12, so that the knuckle joint of the pivotal connection forms one end thereof and extends toward the axle, while the free ends of the two levers of the pivotal connection extend outwardly in the opposite direction. Consequently, as shown, the spring 12 is either immediately in rear of the upper spring member 2, or immediately in front thereof, depending upon whether the spring arrangement shown is at the front or at the rear of the vehicle, inasmuch as the axle 5 may be either the front or the rear axle of an automobile or of another vehicle.

It will be seen that the arrangement of the spring and levers is advantageous in various ways. For example, the spring does not hang down below the leaf spring 4, and is not in position to strike on anything below. Furthermore, the spring 12 is directly in rear of the leaf spring 2, and the levers are compartively thin and close to the sides of the leaf springs, so that the gasoline tank of any automobile, as for example the well known Dodge car, will not interfere in any way with the action of the shock absorber thus constructed and applied to the rear springs of the vehicle.

What I claim as my invention is:

The combination of a vehicle body frame, an upper leaf spring secured thereto, a lower leaf spring having one end connected to said frame, an axle on which said lower member rests, levers pivoted between their ends on the adjacent ends of said springs, a pivotal connection between said levers, forming a knuckle joint 11 disposed above the lower leaf spring and projecting toward said axle, and a single coil spring disposed in the vertical plane of said leaf springs and stretched between the ends of said levers which project outwardly in opposite direction to sustain a tensile strain when a load weight is imposed on said frame, one lever forming an upwardly extending guide 13 in which said upper leaf spring is free to move up and down, but which guide forms no part of the pivotal connection thus provided from the end of one leaf spring to the other, and the other lever forming a guide 15 for the lower leaf spring.

Signed.

EMIL M. TOTZKE.